No. 857,272. PATENTED JUNE 18, 1907.
G. ENRICO.
BRAKE FOR MOTOR VEHICLES.
APPLICATION FILED AUG. 16, 1906.

UNITED STATES PATENT OFFICE.

GIOVANNI ENRICO, OF TURIN, ITALY, ASSIGNOR TO F. I. A. T. FABBRICA ITALIANA AUTOMOBILI TORINO, OF TURIN, ITALY.

BRAKE FOR MOTOR-VEHICLES.

No. 857,272.     Specification of Letters Patent.     Patented June 18, 1907.

Application filed August 16, 1906. Serial No. 330,817.

*To all whom it may concern:*

Be it known that I, GIOVANNI ENRICO, engineer, residing at Turin, Italy, Corso Dante 35, a subject of the King of Italy, have invented certain new and useful Improvements in Brakes Especially Intended for Motor-Vehicles, of which the following is a full, clear, and exact specification.

The object of this invention is to provide an efficient brake having a gradual action and especially adapted for use with motor-vehicles.

Figure 1:
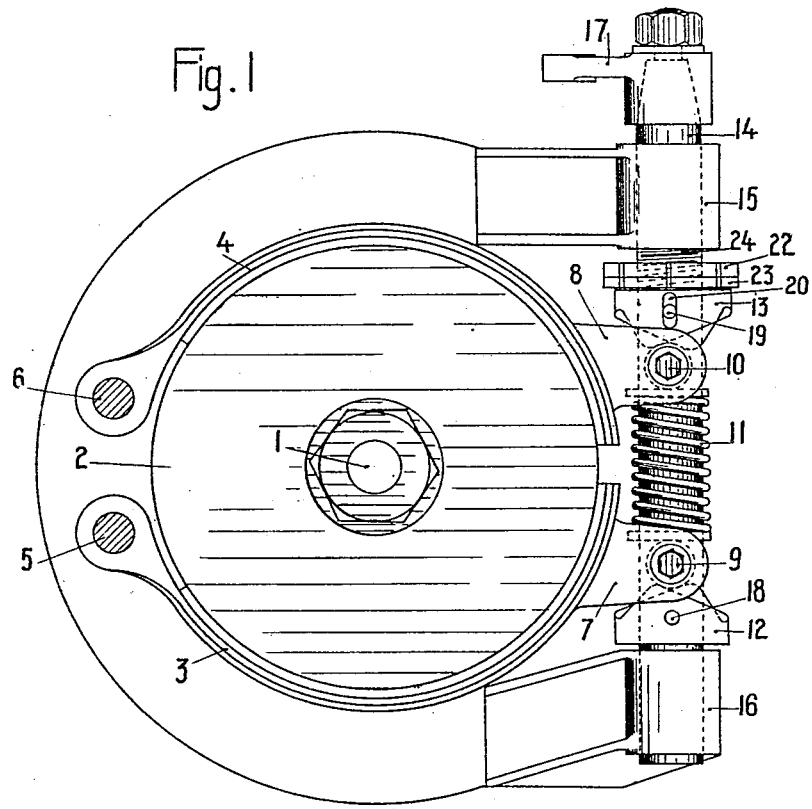
Figure 2:
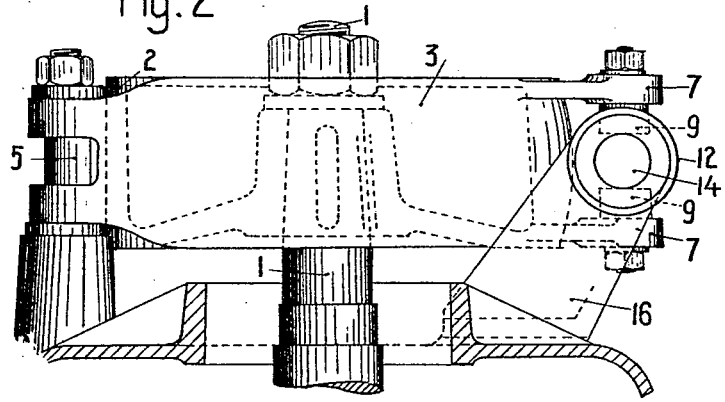

In the accompanying drawing, Figure 1 is a front view and Fig. 2 a side view, of an arrangement in accordance with this invention.

1 is the brake-shaft, which carries a drum 2 keyed thereon, and is surrounded by jaws 3 and 4, pivoted respectively at 5 and 6 to the framing of the vehicle. Each end of these jaws is provided with two lugs, 7 and 8 respectively, to which are fixed pivots, or projections, 9 and 10, respectively, subjected on one side to the action of a helical spring 11, (which tends to keep the pivots apart) and on the other side subjected to the action of cams 12 and 13 respectively, the raised parts of which, when they are turned, tend to bring the said pivots nearer to each other against the action of the spring 11. The cams 12 and 13, are mounted on an operating shaft 14 capable of turning in supports 15 and 16 carried by the framing of the vehicle and provided with a lever arm 17, which may be actuated by hand, or by a treadle (through any suitable gearing), so as to turn the shaft 14, to the required extent and press the jaws 3 and 4 onto the drum 2 with the required degree of force. The cam 12 is fixed to the shaft 14, by means of a transverse pin 18, while the cam 13 is secured to the said shaft 14 by means of a transverse pin 19 passing through an elongated slot 20 provided in the cam so that the said cam can move longitudinally to a certain extent but cannot turn on the shaft. It is thus possible to adjust exactly the position of the cam 13, so as to regulate the extent of movements of the shaft 14 necessary to apply and release the brakes efficiently. In order to fix the cam 13 in the required position a pair of notched disks, or nuts, 22 and 23 are screwed on the screw-threaded portion 24 of the shaft 14.

Having now particularly described and ascertained the nature of the said invention and in what manner the same is to be performed I declare that what I claim is:

1. In a motor vehicle or the like, a brake comprising a drum, a pair of jaws adapted to act against said drum, a shaft, a pair of cams mounted upon said shaft and adapted to actuate said jaws, means for turning said shaft, and means for adjusting the position of one of said cams upon said shaft.

2. In a motor vehicle or the like, a brake comprising a drum, a pair of jaws adapted to act against said drum, a shaft, a pair of cams mounted upon said shaft and adapted to actuate said jaws, one of said cams having a nonrotative sliding connection with said shaft, and means for adjusting the position of said cam on said shaft.

3. In a motor vehicle or the like, a brake comprising a drum, a pair of jaws adapted to act against said drum, a shaft, a pair of cams mounted upon said shaft and adapted to actuate said jaws, one of said cams having a slot, and a pin fixed to said shaft and extending into said slot, and a set nut adapted to be adjusted on said shaft and to limit the movement of said cam.

4. In a motor vehicle or the like, a drum, a pair of pivoted jaws adapted to act against said drum, a shaft having a pair of cams, one of which is fixed and the other of which is formed with a slot, a pin fixed to said shaft and entering said slot, a set nut having notches or the like screwing on said shaft and limiting the movement of the slotted cam, and means for turning said shaft.

5. In a motor vehicle or the like, a drum, a pair of pivoted jaws adapted to act against said drum, a shaft having a pair of cams, each of said cams having two faces, and two pairs of projections fixed to said jaws and engaging said cams, one of each pair of projections lying on the opposite side of said shaft to the other of such pair.

6. In a motor vehicle or the like, a brake comprising a drum, a pair of jaws adapted to act against said drum, a shaft having a fixed bearing on each side of said jaws, a pair of cams each mounted upon said shaft between one of the shaft bearings and the ends of said jaws, said cams being adapted to actuate said jaws, means for turning said shaft, and means for adjusting the positions of one of said cams upon said shaft.

In witness whereof, I have hereunto signed my name in the presence of two subscribing witnesses.

GIOVANNI ENRICO.

Witnesses:
 MARII CAPUEROO,
 GATT. C. PIRONI